Patented Sept. 8, 1953

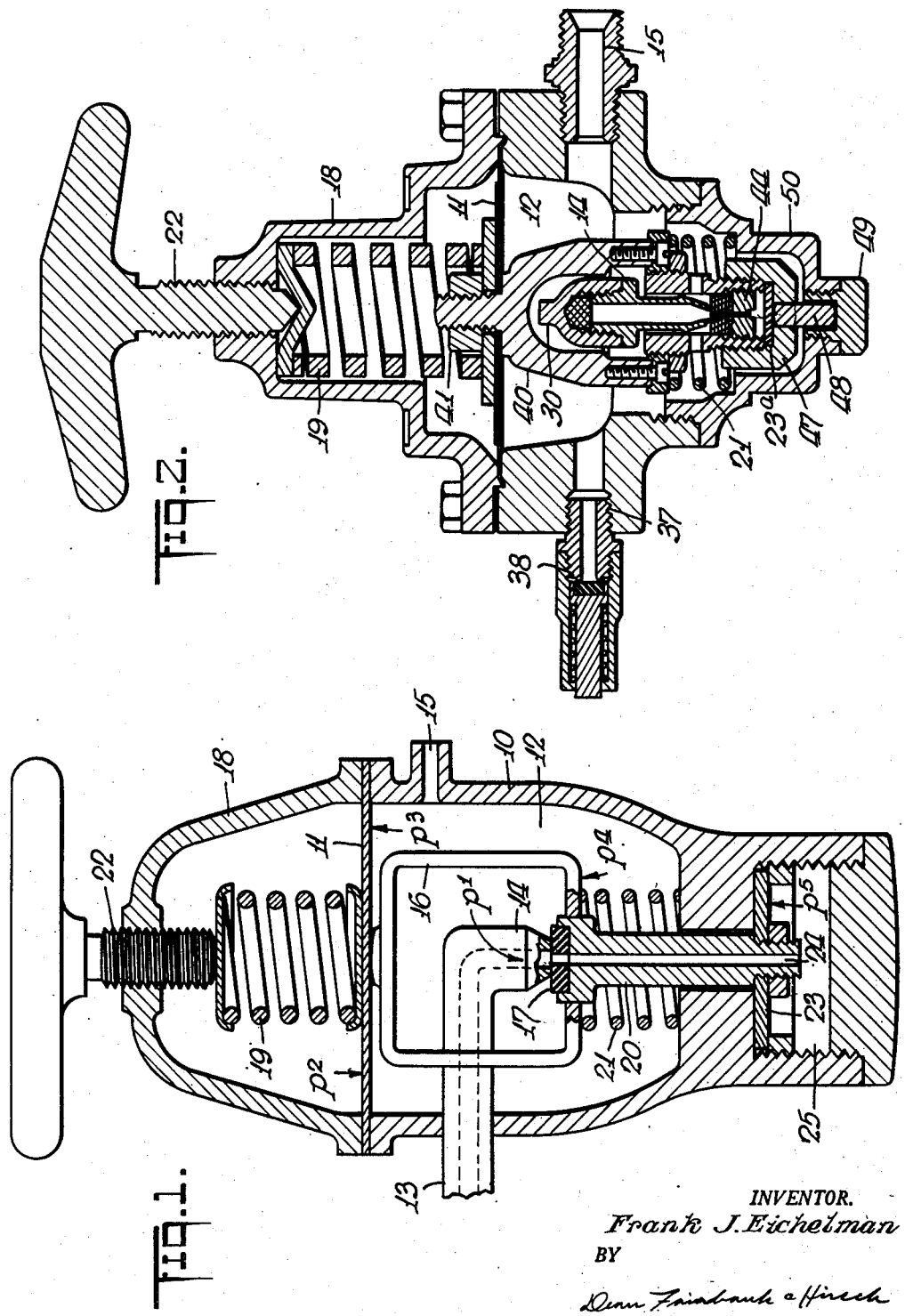

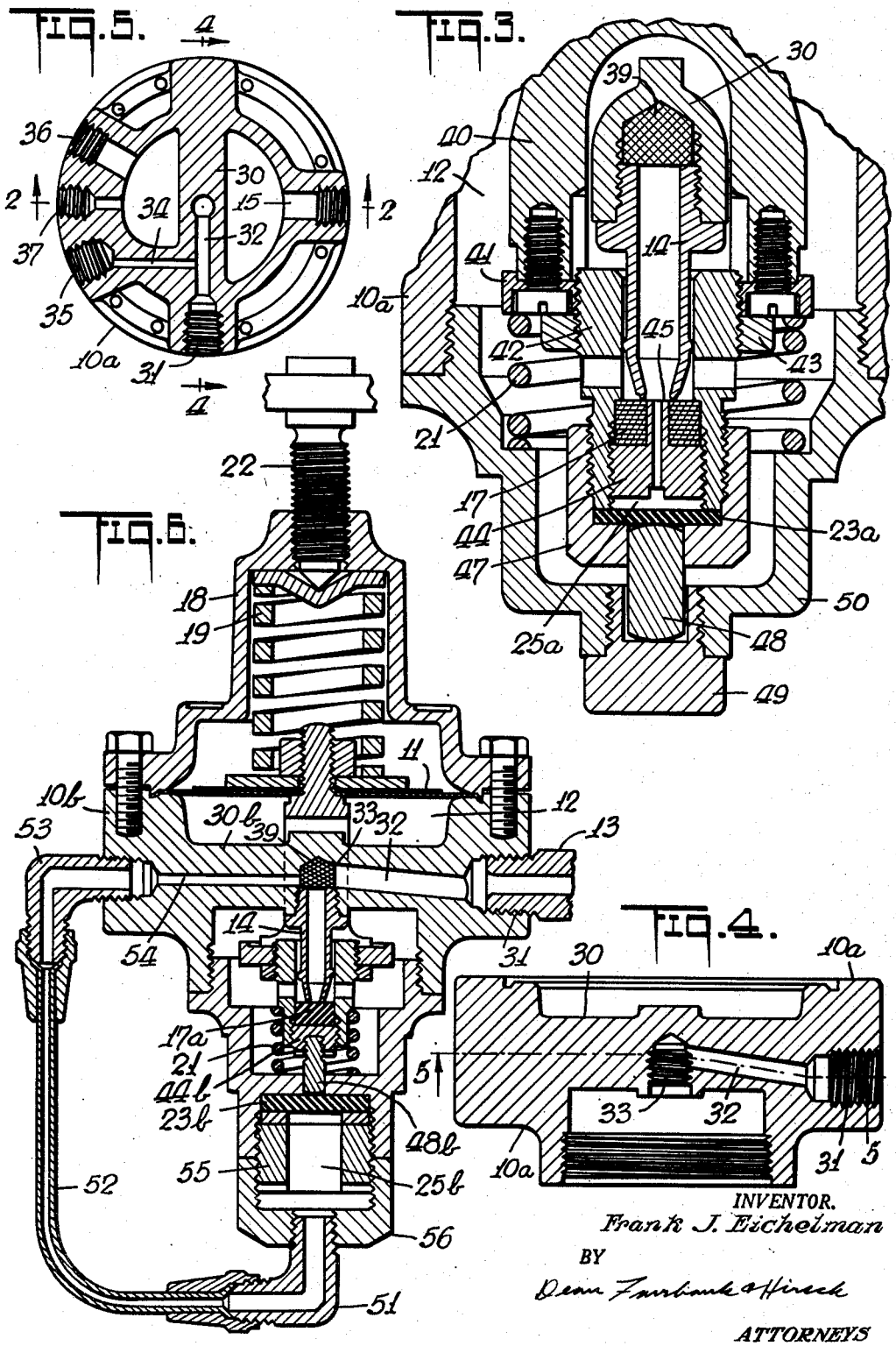

2,651,147

UNITED STATES PATENT OFFICE 2,651,147

GAS PRESSURE REGULATOR

Frank J. Eichelman, Brookfield, Ill., assignor to National Cylinder Gas Company, Chicago, Ill., a corporation of Delaware Application October 9, 1947, Serial No. 778,939

15 Claims. (Cl. 50—23)

This invention relates to fluid pressure regulators of the type in which the high pressure gas is delivered through a nozzle into a low pressure chamber where it acts against a diaphragm which carries means for preventing or permitting flow of gas through the nozzle into said chamber. Ordinarily this means is a disc or valve seat engageable with the end of the nozzle to stop the flow of gas into the chamber when the pressure in said chamber reaches a predetermined value, which value it is desired to maintain on the gas delivered from said chamber.

In most such devices there is a non-adjustable spring in said chamber aiding the low gas pressure in the chamber in its tendency to close the valve, and there is also employed an adjustable spring on the opposite or outer side of the diaphragm, and supplementing the high pressure of the gas in the nozzle and against the seat, and tending to force the valve seat and diaphragm away from the nozzle when the pressure in said chamber is below the desired delivery pressure.

Such a construction operates satisfactorily if the pressure on the high pressure gas remains constant. By merely adjusting the pressure of the last mentioned spring any desired low and substantially constant delivery pressure may be indefinitely maintained.

In many commercial uses of such regulators the high pressure gas is delivered from a portable cylinder, and when the contents of such cylinder is used up, or the pressure therein gets below a practical minimum, the cylinder is removed and replaced by a fresh one.

The pressure in the cylinder may be 2000 p. s. i. or more at the start, and the gas may be withdrawn until the pressure has dropped to about 200 p. s. i. or less. During such drop in supply pressure there will be a corresponding drop in the delivery pressure unless the last mentioned spring is adjusted at frequent intervals to compensate for drop in the pressure exerted on the gas through the nozzle.

The main object of my invention is to provide a regulator of the type above referred to, and in which the delivery pressure may be maintained substantially constant during drop in supply pressure through a wide range, as for instance from 2000 p. s. i. to 200 p. s. i., without the necessity of regulating from time to time the effective pressure of any spring, and without any adjusting operation on the part of the user. In other words, by means of my invention it is possible to automatically maintain constant the delivery pressure during a wide change in gas supply pressure.

As the most important feature of my invention I provide means whereby the high gas pressure acting through the nozzle on the valve seat or disc is counterbalanced at all times by an equal and opposite pressure, so that changes in gas supply pressure no longer have any substantial effect in moving the valve seat or disc, and the delivery pressure may be maintained constant at any value determined by the setting of the adjustable spring.

As a further important feature I provide a second or auxiliary diaphragm also connected to the valve seat, and I subject said auxiliary diaphragm to the same supply pressure as that exerted on the seat through the supply nozzle. The pressure exerted on the auxiliary diaphragm acts in the opposite direction to that exerted through the supply nozzle. Therefore as the pressure of the gas supplied to the regulator changes, there will be a change in the pressure applied to said seat through said nozzle, and tending to move the seat away from the nozzle, and there will be an equal change in the pressure on the gas acting on said auxiliary diaphragm and tending to move the seat toward the nozzle. As these pressures remain equal, even during a drop in the supply pressure through a wide range, the delivery pressure will be controlled solely by the pressure on the spring, which may be adjusted to give and maintain any desired delivery gas pressure.

So far as I am advised, it is broadly new to automatically maintain the delivery gas pressure constant during a wide variation in the pressure of the gas supplied to a gas pressure regulator having a single valve reduction.

I believe it is also broadly new to so construct and arrange the parts of a gas pressure regulator that variations in the pressure of the gas supplied exerts no tendency either to open or close the valve through which the gas is supplied to a low pressure chamber.

In the accompanying drawings I have shown several embodiments of my invention. In these drawings:

Fig. 1 is a somewhat diagrammatic showing of a regulator in central longitudinal section, and embodying my invention.

Fig. 2 is a similar section through a commercial embodiment.

Fig. 3 is a section similar to a portion of Fig. 2, but upon an enlarged scale, more clearly to show the parts.

Fig. 4 is a section through the main casing member of the regulator, and taken in a vertical plane at right angles to the plane of Fig. 2.

Fig. 5 is a horizontal section on the line 5—5 of Fig. 4, and indicating by the lines 2—2 and 4—4 the sections on which Figs. 2 and 4 are taken, and Fig. 6 is a section showing a somewhat different construction embodying the same invention, and taken through a regulator in a section corresponding to one at right angles to the plane of Fig. 2.

In Fig. 1 a regulator is somewhat diagrammatically shown, and embodies a main body member 10 closed at one side by a diaphragm 11 to form a low pressure chamber 12. A supply pipe 13 projects through one wall and terminates in a nozzle 14 facing in a direction away from the diaphragm, and the chamber has an outlet 15 through which the gas under the desired low pressure may be delivered to the place of use, which may be a cutting or welding torch or any other apparatus to which it is desired to deliver gas under a constant pressure which is substantially lower than the supply pressure in the pipe 13 and nozzle 14. The diaphragm has a yoke 16 secured thereto and carrying valve means for controlling gas flow through the nozzle. Such valve means usually comprises a disc or valve seat 17 of non-porous resilient material. Secured to the casing and usually employed as a means for tightly clamping the peripheral edge of the diaphragm 11 to the main casing 10, is a cap 18 enclosing an adjustable spring 19, whereby pressure may be applied to the outer surface of the diaphragm and in opposition to the pressure of the gas in the chamber 12. The yoke usually has a stem 20 which may be guided in a socket in or carried by a wall of the casing or body member 10, so as to prevent any tilting of the valve seat, and insuring that its movement be only directly toward or away from the end of the nozzle. There is usually also provided a spring 21 in the chamber 12 and acting to supplement the gas pressure in said chamber in forcing the valve seat 17 against the nozzle.

To the extent so far described, the parts are those of many well known types of gas pressure regulators.

From the foregoing it will be seen that there are four forces acting to control the movement of the valve disc and to control its position. These forces and their direction of action are indicated on Fig. 1 by the arrows P1, P2, P3 and P4. In considering them, the hole through the valve disc 17 and stem 20 and the parts below the spring 21 are not present in ordinary regulators, and for the present are to be ignored.

Force P1 is the high pressure exerted by gas in the nozzle on a small area of the valve disc, and tending to open the valve.

Force P2 is that of the spring 19 acting on the outer side of the diaphragm and tending to push the diaphragm in and open the valve.

Force P3 is that of the low pressure gas in the chamber 12 which acts on the diaphragm and tends to close the valve.

Force P4 is that of the spring 21 in the low pressure chamber 12, and supplementing force P3 in tending to close the valve.

To hold the valve closed with the seat against the nozzle, the sum of forces P1 and P2 should equal the sum of forces P3 and P4; and to hold the valve open and maintain a constant gas flow, force P3 slightly lowers, due to withdrawal of gas, and the sum of forces P1 and P2 slightly exceeds the sum of forces P3 and P4. Force P4 is substantially constant; force P2 is adjustable, and it is desired that force P3 remain constant. Therefore, if force P1 decreases, it is necessary to increase force P2 in order to keep constant force P3, which is the low pressure gas.

In an important commercial use of such regulators, the gas is supplied from a high pressure gas cylinder, and as the gas is drawn off the pressure in the cylinder decreases, and therefore the gas pressure effecting force P1 progressively decreases. As a result, force P3, namely the delivery gas pressure, decreases unless the tension of the spring exerting force P2 be increased by turning a screw 22 to compensate for decrease of force P1, namely supply gas pressure.

As an example, if the diaphragm has an area of 6 sq. in., the nozzle passage has an area of .017 sq. in., the gas pressure is 2000 p. s. i., and the spring exerting force P4 applies an effective pressure of 40 pounds on the diaphragm, then the spring exerting force P2 should be adjusted to give an effective pressure of slightly over 306 pounds to maintain the valve open and to maintain the delivery pressure at 50 p. s. i., as will be seen from the following:

Force P1 (supply gas) _____ 2000×.017=34
Force P2 (adjustable spring 19) _          306
                                          ———
                                           340
                                          ====

Force P3 (delivered gas) 50×6 sq.
  in _____       300
Force P4 (non-adjustable spring
  21) _____        40
                                          ———
                                           340 or the spring 19 exerting force P2 must be adjusted to exert a pressure substantially higher than 306, as shown by the following:

Force P1 (supply gas) _____ 200×.017=3.4
Force P2 (adjustable spring 19) _        336.6
                                         ———
                                         340.
                                         ====

Force P3 (delivered gas 50×6
  sq. in_____ 300.
Force P4 (non-adjustable spring
  21) _____  40.
                                       ———
                                       340.

Therefore, if a constant delivery pressure is desired, it is necessary to frequently adjust the pressure exerting force P2 to compensate for the progressive decrease in force P1 exerted by the supply gas pressure.

By means of the present invention it is possible to provide a gas pressure regulator which will deliver gas under a substantially constant pressure during decrease in supply pressure, and without the necessity of making manual adjustments of the spring pressure from time to time. I accomplish this object by bringing to bear force P5 tending to close the valve, and which force progressively decreases at the same rate as does force P1.

In carrying out my invention I provide an auxiliary diaphragm 23 which is operatively connected to the main diaphragm and to the valve seat, and which is preferably substantially smaller than the main diaphragm 11. This diaphragm 23 is subjected to the pressure of the supply gas, which may be delivered in any suitable manner, as for instance through a passage 24 which connects a chamber 25 below the diaphragm with the source of high pressure gas. As most of the area of the auxiliary diaphragm 23 abuts the casing or body 10, it is only upon the base area of the stem 20 minus the area of passage 24 that the force P5 is effective. This area, area and the area of the seat 17 minus the area of passage 24 upon which the gas pressure from nozzle 14 is effective are so proportioned that the force P1 substantially equals force P5. Force P5 on this auxiliary diaphragm acts on the valve in the same direction as does force P3 of the delivery gas acting on the main diaphragm. Thus the high pressure gas acts in opposite directions against the valve seat, and forces P1 and P5 substantially neutralize each other at all times. As force P4 is constant and it is desired to maintain force P3 constant, force P2 may remain constant and equal to force P3 + P4, and the delivery pressure in the chamber 12 will remain constant during a dropping of the supply pressure through a wide range. The delivery pressure (force P3) may be initially fixed by adjustment of the spring 19, and no further adjustment of this spring is necessary. If the high pressure gas be delivered to the chamber 25 by a passage 24 extending from the nozzle through the valve seat 17 and the stem 20, it may be considered that there is no excess pressure applied to either side of the valve seat, and that there is no force exerted by the high pressure gas on the seat, and which would tend to move said seat in either direction.

In Figs. 2 to 5 inclusive there is shown in more detail a commercial embodiment and, so far as applicable, the same reference numerals are employed as in Fig. 1, or those same numerals with the letter "a" will be used to designate corresponding parts, and the main functions and operation of the parts designated by those numerals need not be restated.

As shown particularly in Figs. 4 and 5, the main body member 10a has a transverse bar portion 30 with a socket 31 to which the high pressure gas supply conduit is connected, and a bore 32 leading to a socket 33 into which the nozzle 14 is screwed. From the bore 32 may lead a smaller bore 34 to socket 35 for a high pressure gauge connection. In the outer wall of the body member is a socket 36 to receive a low pressure gauge connection. A safety pressure-release device 38 may be connected in a socket 37. Preferably a screen or gas filter 39 is mounted in the socket 33 and between the bore 32 and the nozzle 14.

Opposite to the delivery end of the nozzle 14 is the valve seat or disc 17, and means are provided for operatively connecting it to the main diaphragm 11. As shown in Figs. 2 and 3, a yoke 40 is connected to the diaphragm by a bolt section and a nut, and the legs of the yoke straddle the bar 30 and carry a collar 41 into which is threaded a sleeve 42 held by a lock nut 43. The sleeve may be guided in its endwise movement with the diaphragm by loosely fitting on the nozzle 14.

Screwed into the sleeve 42 is a plug 44 having an axially extending tube 45 smaller than and coaxial with the passage through the nozzle 14, and through which high pressure gas may flow from the nozzle to a chamber 25a. The valve seat or disc 17 rests on this plug and encircles said tube 45. Threaded on the exterior of the sleeve 42 is a clamping collar or nut 47 which clamps the periphery of the auxiliary diaphragm 23a tightly against the end of the sleeve 42. The nut 47 has a centrally disposed hole in the end wall, and in this is loosely and slidably mounted a plunger 48 which also loosely fits in and abuts against the diaphragm 23a. A plug 49 is threaded into a large cap 50 threaded into the main body member 10a to form an end wall thereof and to enclose and protect the sleeve 42 and parts connected thereto, and serve as an abutment for the spring 21.

It will be noted that in this form the high pressure gas in the nozzle 14 may flow through the tube 45 to the upper side of the auxiliary diaphragm 23a instead of to the under side, as in Fig. 1, but the effect is the same. The high pressure acting on the auxiliary diaphragm 23a cannot materially displace its center part outward of the chamber 25a because of engagement with the rigid member or plunger 48 which abuts the plug 49 that is part of the regulator casing. Therefore the high pressure applied to the auxiliary diaphragm 23a tends to urge the entire chamber 25a upward, and hence to urge the diaphragm 23a and the parts clamped thereto, namely the parts 47 and 44 and the valve seat 17 toward the nozzle 14 with a force that is directly proportional to the high pressure in the nozzle. Since these last named parts are connected through the yoke 40 to the main diaphragm, the force of the high pressure gas applied to the auxiliary diaphragm 23a is thus applied in the same direction as the force of the low pressure gas on the main diaphragm 11. In doing so the auxiliary diaphragm 23a may be forced downwardly into the opening or passage occupied by the stationary abutment 48 to a slight extent. It is important to note that the pressure in the chamber 25a is the same as that in the nozzle, and the high pressure in the nozzle tending to force the valve seat down is counterbalanced by the same high pressure in the chamber 25a tending to push the valve seat up against the nozzle. It will be apparent that the counterbalancing force of the high pressure gas in the chamber 25a not only may be made to equal the force of the high pressure gas in nozzle 14 applied to the valve seat 17 as shown, but that it may be made greater or less than the force applied through the nozzle to the valve seat through the selection of appropriate dimensions for the rigid member or plunger 48 and the opening through which it makes contact with the auxiliary diaphragm 23a.

The construction shown in Fig. 6 combines certain features of Fig. 1 and Figs. 2 to 5 inclusive. The chamber 25b is below the auxiliary diaphragm, as in Fig. 1, but the passage to said chamber, instead of being through the valve disc, is through an elbow 51, a tube 52 and an elbow 53 connected to the main body member 10b. The latter has a bore 54 leading through the bar portion 30b to the socket 33 into which the nozzle 14 is secured. Thus the pressure of the high pressure gas may be transmitted through these parts to the under side of the auxiliary diaphragm 23b. The plug 49 of Figs. 2 and 3 is replaced by a hollow screw plug 55 which clamps the diaphragm 23b in place, and the elbow 51 is secured to a cap 56 screwed onto the end of the screw plug 55. The plug 44b is imperforate, and the plunger 48b spaces the center of the diaphragm from the plug 44b so that the pressure in chamber 25b tends to push the valve seat against the nozzle.

Thus it will be seen that in all of the various forms illustrated the valve seat is pressed against the nozzle solely by the pressure of the low pressure gas acting on the main diaphragm, and that the valve seat is subjected to the pressure of the high pressure acting equally in opposite directions, so that the net effect is that the high pressure of the supply gas exerts no force tending to move the valve seat either toward or away from the nozzle end, and it is not necessary to adjust the tension of any spring in order to maintain the delivery pressure constant during decrease in the pressure of the supply gas.

The balance of the pressure of the high pressure gas on the valve disc and the moving of the disc solely by the pressures of the adjustable spring and the low pressure have a further important advantage. In operation, the volume of gas flow from the nozzle to the chamber should be the same as the volume of gas flow from the chamber to the place of use, regardless of the gas pressure in the supply tank and in the nozzle. As the pressure of the gas in the nozzle in my improved construction is not utilized to impart any valve opening force on the valve, the spring 19 acting on the diaphragm will hold the valve disc in the proper position to insure the proper rate of flow from the nozzle to the chamber equal to the rate of flow of gas from the chamber under the desired pressure, but the higher the pressure in the nozzle the greater the tendency to push the valve disc farther from the nozzle.

To insure a uniform rate of flow of gas from the regulator and under a constant pressure, the spacing of the valve disc from the nozzle will be far less and the velocity of flow from high to low pressure will be far greater when the pressure in the nozzle is very high, for instance 2000 p. s. i., than what it is when the supply pressure has dropped to 200 p. s. i., for instance. This makes the maintenance of a uniform pressure in the discharge chamber difficult when the flow from the delivery chamber is intermittent and suddenly stopped and started. By balancing the effect of the high pressure gas on the seat, and moving the valve seat solely by the main diaphragm and the spring a uniform pressure in the chamber under all conditions of use may be more easily maintained.

I have illustrated my invention as applied to a type of regulator in which the nozzle is between the diaphragm and the valve seat which is carried by the diaphragm, and the gas from the nozzle is directed away from the diaphragm, but it will be obvious that the invention is equally applicable to regulators having the parts in other relative positions, as for instance, in a so-called stem type regulator. In that type the valve seat is connected to the diaphragm by a rod extending through the nozzle, and the gas flows through the nozzle toward the diaphragm instead of away from it. In other words, the valve seat is at the high pressure instead of the low pressure end of the nozzle.

In applying the invention to that type of regulator the second or added diaphragm, which is connected to the valve seat, has the high pressure gas act on the upper rather than the under side of this diaphragm, and the under side is vented to the atmosphere.

Having thus described my invention what I claim as new and desire to secure by Letters Patent is:

1. A gas pressure regulator comprising a low pressure discharge chamber, one outside wall of which is formed by a diaphragm against which the low discharge pressure in said chamber is exerted, an adjustable spring pressure exerted inwardly against said diaphragm, a fixed high pressure discharge nozzle disposed in said chamber, a valve member in said chamber connected to said diaphragm and cooperating with said nozzle for controlling the flow of gas from said nozzle into said chamber in response to the pressure on said diaphragm and the pressure of gas in said nozzle, an auxiliary diaphragm connected to the side of said valve member opposite said nozzle, and means for maintaining a gas pressure against said auxiliary diaphragm substantially the same as in said nozzle and in a direction to urge said valve member toward said nozzle with a force proportional to the pressure of gas in said nozzle, whereby said valve member is operated by the conjoint action of said spring pressure and said diaphragm.

2. A gas pressure regulator including a low pressure discharge chamber having a diaphragm forming one wall thereof, a high pressure discharge nozzle in said chamber, a valve seat in said chamber, connected to said diaphragm and coacting with said nozzle to control the flow of gas from the latter into said chamber, an auxiliary diaphragm connected to the side of said valve seat opposite said nozzle, and means for applying to a surface of said auxiliary diaphragm the same high pressure as is in said nozzle and in a direction opposite thereto with a force proportional to the force exerted by the gas pressure in said nozzle.

3. In a pressure regulator of the type in which there is provided a fixed high pressure gas supply nozzle, a diaphragm subjected on one side thereof to low pressure delivery gas, a valve seat connected to said diaphragm and a spring acting on said diaphragm and in opposition to the pressure of said low pressure delivery gas on said diaphragm, said regulator being characterized by a second diaphragm connected to the side of said valve seat opposite said nozzle, means for applying to said second diaphragm the same high pressure as exists in said nozzle in a direction tending to move said seat toward said nozzle with a force proportional to said high pressure in said nozzle, whereby movement of said seat toward and from said nozzle is substantially independent of variations in the pressure of the high pressure supply gas.

4. A gas pressure regulator including a low pressure discharge chamber, a fixed high pressure nozzle within said chamber, a valve seat in said chamber movable toward and away from said nozzle and coacting therewith to control the flow of gas therefrom to said chamber, and means for applying a pressure equal to the pressure of the gas in said nozzle to the side of said valve seat opposite said nozzle to force said seat toward said nozzle and to substantially counterbalance the pressure applied on said seat by the gas in said nozzle.

5. A gas pressure regulator of the type which includes a delivery gas pressure chamber having one wall thereof formed by a diaphragm, a fixed high pressure gas supply nozzle in said chamber, a valve seat connected to said diaphragm and movable therewith toward and from the end of said nozzle for controlling the flow of gas from the high pressure in said nozzle to the lower pressure in said chamber, said regulator being characterized by an auxiliary diaphragm movable with said seat and arranged with one side facing the side of said seat opposite said nozzle, and passage means for conducting high pressure gas from said nozzle to the other side of said auxiliary diaphragm to urge said valve seat toward said nozzle with a force directly proportional to said high pressure in said nozzle.

6. A gas pressure regulator as defined in claim 5, and in which said passage means leads through said valve seat and through said auxiliary diaphragm.

7. A gas pressure regulator as defined in claim 5, and in which said passage means conducts high pressure gas to the side of said auxiliary diaphragm farthest from said valve seat.

8. A gas pressure regulator of the type which includes a delivery gas pressure chamber having one wall thereof formed by a diaphragm, a fixed high pressure gas supply nozzle in said chamber, a valve seat connected to said diaphragm and movable therewith toward and from the end of said nozzle for controlling the flow of gas from the high pressure in said nozzle to the lower pressure in said chamber, said regulator being characterized by an auxiliary diaphragm also connected to said seat opposite said nozzle and a passage for conducting high pressure gas from said nozzle through said valve seat to the side of said auxiliary diaphragm nearest to said valve seat, and means including a rigid non-yielding member opposing movement of said auxiliary diaphragm away from said valve seat, whereby said high pressure gas applied to said auxiliary diaphragm is exerted as a force urging said valve seat toward said nozzle.

9. A gas pressure regulator of the type which includes a delivery gas pressure chamber having one wall thereof formed by a diaphragm, a fixed high pressure gas supply nozzle in said chamber, a valve seat connected to said diaphragm and movable therewith toward and from the end of said nozzle for controlling the flow of gas from the high pressure in said nozzle to the lower pressure in said chamber, said regulator being characterized by an auxiliary diaphragm connected to said seat opposite said nozzle, a passage for conducting high pressure gas from said nozzle through said valve seat into a chamber having an opening opposite said valve seat, said auxiliary diaphragm extending over said opening in said chamber and a non-yielding member positioned in said opening opposing movement of said auxiliary diaphragm away from said valve seat, whereby pressure on said auxiliary diaphragm member is applied as a force urging said valve seat toward said nozzle.

10. A fluid pressure regulator for delivering fluid at a substantially constant low delivery pressure and received from a supply source at a higher pressure which decreases, including a casing having a diaphragm of which one surface is subjected to the desired low delivery pressure, a spring acting thereon, means for adjusting the pressure of said spring to vary said delivery pressure, an auxiliary diaphragm operatively connected to said first-mentioned diaphragm and having one surface subjected to said supply high pressure, a nozzle for high pressure fluid having its discharge end in fixed position between said diaphragms, a valve seat opposed to said nozzle to control the flow of fluid therefrom arranged between and operatively connected to both diaphragms to be urged toward said nozzle by the delivery gas pressure applied to said first-mentioned diaphragm and by the supply pressure applied to said auxiliary diaphragm, and a second and nonadjustable spring acting in opposition to said first-mentioned spring to urge said seat toward said nozzle, whereby the decrease of said supply high pressure acting on said auxiliary diaphragm will permit said valve seat to move from said nozzle to increase the flow of fluid therethrough.

11. In a gas pressure regulator having a diaphragm subjected to delivery gas pressure regulated by an adjustable pressure applied to the opposite side thereof, a fixed nozzle through which is supplied gas at a higher and varying supply pressure, and a valve seat subjected to said gas supply pressure at said nozzle and movable with said diaphram toward and away from said nozzle to control the flow of gas therefrom; the combination of a chamber operatively connected to and movable with said valve seat, said valve seat having a passage therethrough to admit gas to said chamber at its supply pressure at said nozzle, the wall of said chamber opposite said valve seat having an opening therethrough closed by an auxiliary diaphragm, and a non-yielding member in said opening against which pressure on said auxiliary diaphragm is exerted to urge said valve seat toward said nozzle with a force directly proportional to said gas supply pressure at said nozzle.

12. In a gas pressure regulator having a diaphragm subjected to delivery gas pressure regulated by an adjustable pressure applied to the opposite side thereof, a fixed nozzle through which is supplied gas at a higher and varying supply pressure, and a valve seat subjected to said gas supply pressure at said nozzle and movable with said diaphragm toward and away from said nozzle to control the flow of gas therefrom; the combination of a chamber connected to and movable with said valve seat, means to admit gas into said chamber at its supply pressure at said nozzle, a wall of said chamber having an opening therethrough closed by an auxiliary diaphragm and means cooperating with said auxiliary diaphragm through said opening against which pressure in said chamber is exerted to urge said valve seat toward said nozzle with a force directly proportional to said gas supply pressure at said nozzle.

13. Method of obtaining a uniform reduced gas pressure from a gas supply at higher and varying pressures with only one manual selective operation for any selected reduced pressure, which comprises the steps of admitting gas from the supply through a presusre operable valve into a pressure-transmitting expansion chamber from which gas is delivered at the selected reduced pressure, applying spring pressure preselected to maintain the valve open in opposition to the selected reduced gas pressure, and applying the gas supply pressure against opposite sides of the valve with forces directly proportional to each other.

14. Method of obtaining a uniform reduced gas pressure from a gas supply at higher and varying pressures with only one manual selective operation for any selected reduced pressure, which comprises the steps of admitting gas from the supply through a pressure operable valve into a pressure-transmitting expansion chamber from which gas is delivered at the selected reduced pressure, applying spring pressure preselected to maintain the valve open in opposition to the selected reduced gas pressure, applying the gas supply pressure against one side of the valve in a direction tending to open it, and exerting a pressure derived from the gas supply against the opposite side of said valve as a force directly proportional to the gas supply pressure.

15. Method of obtaining a uniform reduced gas pressure from a gas supply at higher and varying pressures with only one manual selective operation for any selected reduced pressure, which comprises the steps of admitting gas from the supply through a pressure operable valve into a pressure-transmitting expansion chamber from which gas is delivered at the selected reduced pressure, applying spring pressure preselected to maintain the valve open in opposition to the selected reduced gas pressure, directly applying the gas supply pressure against one side of the valve in the direction tending to open it, and indirectly applying the pressure of the gas supply against the opposite side of said valve as a counterforce that is directly proportional to the gas supply pressure applied directly to the valve.

FRANK J. EICHELMAN.

References Cited in the file of this patent

UNITED STATES PATENTS

| Number | Name | Date |
|---|---|---|
| 159,732 | Wesebrock | Feb. 9, 1875 |
| 331,544 | Reinecke | Dec. 1, 1885 |
| 644,406 | Crawford | Feb. 27, 1900 |
| 646,428 | Hardie | Apr. 3, 1900 |
| 718,694 | Chapman | Jan. 20, 1903 |
| 880,402 | Reynolds | Feb. 25, 1908 |
| 1,525,426 | Mueller | Feb. 3, 1925 |
| 1,944,424 | Gleason | Jan. 23, 1934 |